MULTIPLEX HIGH-FREQUENCY ELECTRICAL PULSE SIGNALING SYSTEM

Original Filed March 14, 1944

Inventors
PRAFULLA KUMAR CHATTERJEA
LESLIE WILFRED HOUGHTON
By [signature]
Attorney Patented Sept. 26, 1950 2,523,279

UNITED STATES PATENT OFFICE 2,523,279

MULTIPLEX HIGH-FREQUENCY ELECTRICAL PULSE SIGNALING SYSTEM

Prafulla Kumar Chatterjea and Leslie Wilfred Houghton, London, England, assignors, by mesne assignments, to International Standard Electric Corporation, New York, N. Y., a corporation of Delaware Original application March 14, 1944, Serial No. 526,566. Divided and this application September 24, 1945, Serial No. 618,332. In Great Britain April 7, 1943

4 Claims. (Cl. 179—15)

Figure 1:
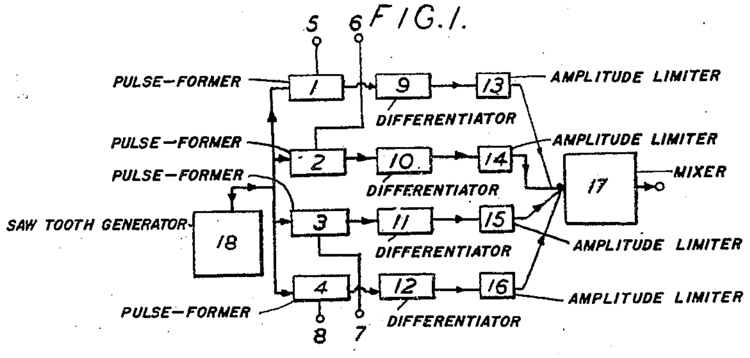

The present invention relates to multiplex signal high frequency transmissions systems of the kind utilising electrical pulses. This application is a division of our co-pending application Serial No. 526,566, filed March 14, 1944, now U. S. Patent No. 2,447,233, issued August 17, 1948.

It is now well known that signal waves bearing intelligence can be transmitted by means of a train of electrical pulses occurring at equal time intervals and whose durations are varied in accordance with the instantaneous amplitude of the signal. Such pulses are herein referred to as duration modulated pulses. In a modification of this system of signal wave transmission, short electrical pulses of constant duration are transmitted to mark the leading and trailing edges of duration modulation pulses, and when either the leading or trailing edges occur at equal intervals of time, only the pulses marking the edges of the duration modulated pulses which occur at varying intervals of time need be transmitted. This type of transmission is sometimes referred to as a single pulse or time phase modulated pulse transmission or pulsed phase modulation, the pulses of constant short duration occurring at varying intervals of time in accordance with the instantaneous amplitude of the signal wave to be transmitted.

When both the fixed and moving marking pulses of a duration modulated system are transmitted, the system is referred to as a double pulse system. In the single pulse system, the fixed pulse may be re-inserted at the receiver and the solid pulses or duration modulated pulses obtained from the fixed and movable pairs of pulses for example by means of known build back circuits. If in the single pulse system the pulse duration is only a small fraction of the time interval between the occurrence of successive pulses, and if the variation of this time interval taken up for a maximum time or phase modulation of the pulses is also small, then other trains of similar pulses may be transmitted having the same pulse repetition frequency, but whose pulses occur in the intervals between the pulses of another train. Thus each pulse train may bear time or phase modulation of its respective signal wave and a multiplex channel transmission system is provided. It is the object of this invention to provide practical arrangements whereby such a system may be put into practice.

In systems of this type four main operations are essential. Firstly, producing the trains of unmodulated or unphased pulses, one train for each channel, the pulses of each train being correctly timed or phased or time-phased to occur with respect to the pulses of other trains of the system, and modulating the pulses of each channel with the respective signal wave. Secondly combining all channels into one transmission. Thirdly, at the receiving end of the system directing the pulses of the channels to respective receiving apparatus. Fourthly, obtaining the signal waves from the train of pulses in the respective channels.

It will be understood that more than one of these operations may be performed by the same equipment, that the pulses may be transmitted by line, wave guide or radio, and may comprise direct current pulses or trains of waves of higher frequency than the pulse repetition frequency.

According to the present invention; in a multichannel electrical pulse signalling system the arrangements for producing in each channel a train of pulses time phased in accordance with the signal wave to be transmitted by said channel, comprise an oscillation generator, a plurality of pulse forming circuit arrangements including amplifiers associated with respective channels, means for applying the outputs from said generator to each of said pulse forming circuit arrangements so arranged as to pass progressively larger portions of the waveform from channel to channel, thus producing in the respective outputs pulses whose durations vary from channel to channel, means for modulating the durations of said pulses in accordance with the modulating waves of the respective channels, means for differentiating the duration modulated pulses and means for eliminating one of the differential series of pulses so obtained to isolate a time-phased series of pulses in each channel.

Figure 2:
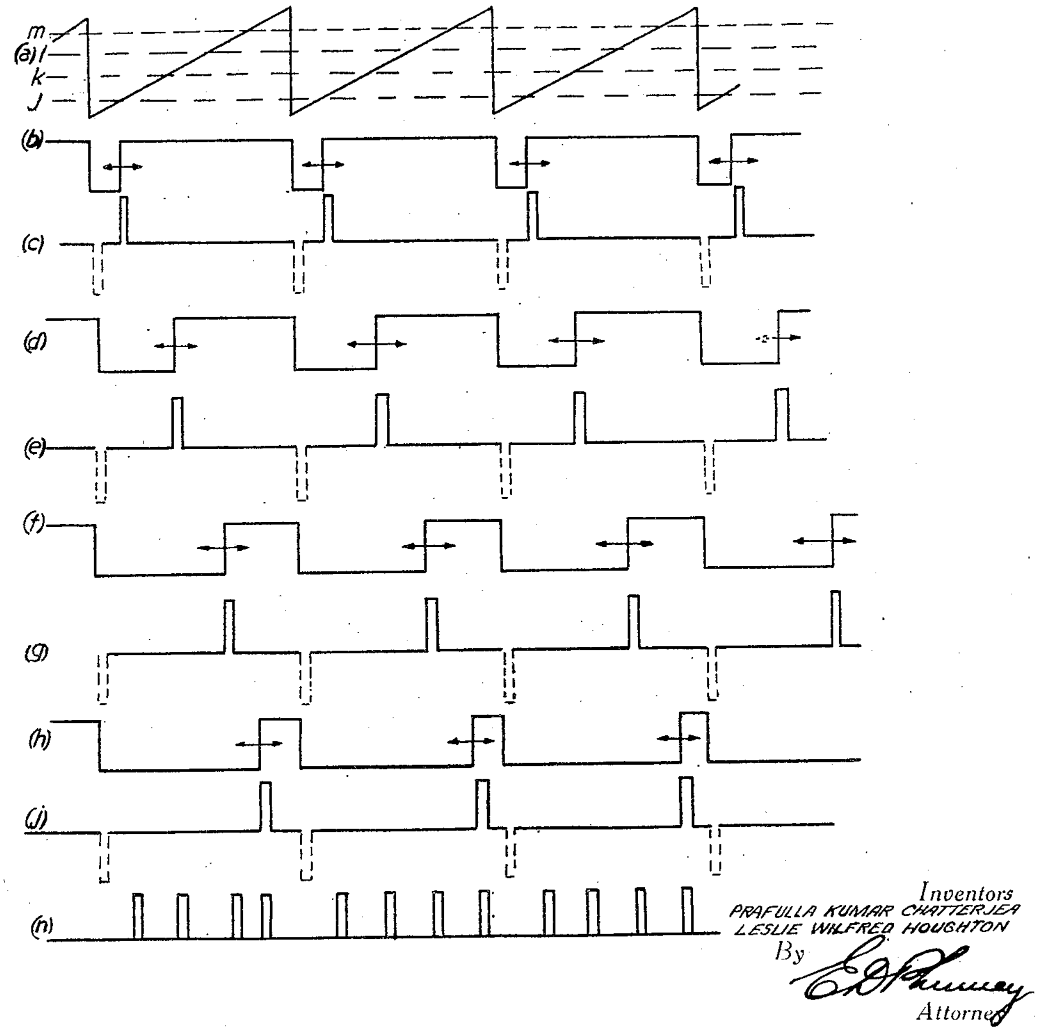

The invention will be better understood from the following description of one embodiment taken in conjunction with the drawings accompanying the provisional specification, in which:

Figure 1 shows in block schematic of a circuit arrangement embodying the invention; and Figure 2 is an explanatory diagram used in connection with Figure 1.

Figure 1 the reference numeral 18 represents a sawtooth generator or generator of any waveform from which it is possible to produce a variable width pulse. This is then fed into pulse former units 1, 2, 3 and 4 respectively each containing an amplifier, and these amplifiers are each biassed or otherwise adjusted so as to pass varying portions of the wave form and thus to produce progressively longer duration pulses from channnel to channel (see Figure 2). By applying also a modifying voltage determined by the channel modulation signal to terminals 5, 6, 7 and 8 respectively, for example, the amplifier control grids, these various width pulses may be duration modulated and then after differentiation by units 9, 10, 11 and 12 which comprise, for example, high pass filters and amplitude limiting by units 13, 14, 15 and 16 respectively, to eliminate one of the differential pulses, the differential pulses due to the moving edges of the duration modulated pulses are obtained and are the required phased pulse trains which may be combined together in amplifier unit 17 prior to being used to modulate a transmitter. If the initial waveform is a sawtooth the resulting pulses will have one fixed edge the differential pulses resulting from which are eliminated, and one variable edge, but in the case of, say, a sine wave both edges will vary. However, this makes no difference as by amplitude limiting the desired differential pulse train may be obtained.

Referring to Figure 2, *a* represents the waveform generated by 30, Figure 1, and dotted lines *j*, *k*, *l*, and *m* represent the cut-off voltages of units 1, 2, 3 and 4 respectively so producing after amplification and amplitude limitation pulse trains shown correspondingly at *b*, *d*, *f*, and *h*, Figure 2. Application of a modulating voltage will cause these pulses to be individually duration modulated, the trailing edge being the variable so that it is from this edge that the required phased pulse can be obtained by differentiation as shown at *c*, *e*, *g*, and *i* respectively.

The pulse derived from the fixed leading edge (shown dotted) is removed by the limiting circuits. On combination at 17, Figure 1, the required pulse train *n*, Figure 2 is obtained.

What is claimed is:

1. In a multichannel electrical pulse signalling system, arrangements for producing in each channel a train of pulses time-phased in accordance with the signal wave to be transmitted by said channel, comprising an oscillation generator producing a wave form output, a plurality of pulse forming circuit arrangements each including an amplifier associated with respective channels, means for applying the output from said generator to each of said amplifiers with the same phase, means for biasing said amplifiers to begin conducting simultaneously but so that successive amplifiers pass successively larger portions of the generator output wave form from channel to channel, thus producing in the combined outputs of all said amplifiers varying-duration pulses overlapping in time whose leading edges coincide but whose trailing edges vary from channel to channel, means for modulating the durations of said pulses in accordance with the modulating waves of the respective channels, means for differentiating the duration-modulated pulses, and means for selecting and combining the differential series of pulses corresponding to the trailing edges of the duration-modulated pulses to obtain a time-phased series of pulses.

2. Arrangements as claimed in claim 1 wherein said oscillation generator produces a sawtooth waveform.

3. Arrangements as claimed in claim 1 including applying to corresponding one of said amplifiers the signal voltage wave to be transmitted by the channel specified to duration modulate the output pulse of said pulse former arrangement.

4. Arrangements as claimed in claim 1 wherein said differentiating circuit comprises a high pass filter feeding into an amplitude limiter device to eliminate one of the pair of pulses of opposite sign resulting from the differentiation operation.

PRAFULLA KUMAR CHATTERJEA.
LESLIE WILFRED HOUGHTON.

REFERENCES CITED

The following references are of record in the file of this patent:

UNITED STATES PATENTS

| Number | Name | Date |
|---|---|---|
| 2,256,336 | Beatty | Sept. 16, 1941 |
| 2,266,401 | Reeves | Dec. 16, 1941 |
| 2,282,046 | Goldsmith | May 5, 1942 |
| 2,391,776 | Fredendall | Dec. 25, 1945 |
| 2,403,210 | Butement | July 2, 1946 |